(12) United States Patent
Bauer et al.

(10) Patent No.: US 10,619,103 B2
(45) Date of Patent: Apr. 14, 2020

(54) CATALYST ADDITION TO A CIRCULATING FLUIDIZED BED REACTOR

(71) Applicant: INAERIS TECHNOLOGIES, LLC, Pasadena, TX (US)

(72) Inventors: Lorenz J. Bauer, Pasadena, TX (US); Richard A. Engelman, Houston, TX (US); J. Christopher Lewis, Houston, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 0 days.

(21) Appl. No.: 15/934,333

(22) PCT Filed: Sep. 23, 2016

(86) PCT No.: PCT/US2016/053470
§ 371 (c)(1),
(2) Date: Mar. 23, 2018

(87) PCT Pub. No.: WO2017/053815
PCT Pub. Date: Mar. 30, 2017

(65) Prior Publication Data
US 2018/0223191 A1    Aug. 9, 2018

Related U.S. Application Data

(60) Provisional application No. 62/233,129, filed on Sep. 25, 2015.

(51) Int. Cl.
*C10B 57/06*    (2006.01)
*C10G 1/08*    (2006.01)
(Continued)

(52) U.S. Cl.
CPC .............. *C10B 57/06* (2013.01); *B01J 8/1809* (2013.01); *B01J 21/14* (2013.01); *B01J 23/74* (2013.01);
(Continued)

(58) Field of Classification Search
CPC ........... C10B 3/00; C10B 39/00; C10B 49/22; C10B 53/02; C10B 57/06; B01J 21/14;
(Continued)

(56) References Cited

U.S. PATENT DOCUMENTS 3,639,228 A    2/1972    Carr et al.
4,426,359 A    1/1984    Woebeke et al.
(Continued)

FOREIGN PATENT DOCUMENTS

EP    0892031 A2    1/1999

OTHER PUBLICATIONS

PCT International Search Report and Written Opinion in corresponding PCT/US16/053470 dated Dec. 8, 2016 (13 pages).
(Continued)

*Primary Examiner* — Brian A McCaig
(74) *Attorney, Agent, or Firm* — John Wilson Jones; Jones Delflache LLP

(57) ABSTRACT

Biomass is converted into a bio-oil containing stream in a riser reactor having multiple ports for the entry of fresh catalyst. Hard coke formed during pyrolysis may be separated from the riser effluent fraction containing which contains spent catalyst, soft coke and char. The separated hard coke may then be fed back into the riser reactor. The riser reactor may further have a cooling media which quenches the rapid heat transfer to the biomass during pyrolysis of the biomass in the mixing zone of the riser.

19 Claims, 7 Drawing Sheets

(51) Int. Cl.
- *B01J 29/08* (2006.01)
- *B01J 21/14* (2006.01)
- *B01J 29/70* (2006.01)
- *B01J 29/40* (2006.01)
- *B01J 8/18* (2006.01)
- *B01J 38/02* (2006.01)
- *B01J 29/90* (2006.01)
- *B01J 23/94* (2006.01)
- *B01J 23/74* (2006.01)
- *C10B 3/00* (2006.01)
- *C10B 39/00* (2006.01)
- *C10B 49/22* (2006.01)
- *C10B 53/02* (2006.01)
- *C10G 1/02* (2006.01)

(52) U.S. Cl.
CPC .............. *B01J 23/94* (2013.01); *B01J 29/08* (2013.01); *B01J 29/40* (2013.01); *B01J 29/70* (2013.01); *B01J 29/90* (2013.01); *B01J 38/02* (2013.01); *C10B 3/00* (2013.01); *C10B 39/00* (2013.01); *C10B 49/22* (2013.01); *C10B 53/02* (2013.01); *C10G 1/02* (2013.01); *C10G 1/08* (2013.01); *B01J 2208/00769* (2013.01); *C10G 2300/1011* (2013.01); *Y02E 50/14* (2013.01); *Y02P 30/20* (2015.11)

(58) Field of Classification Search
CPC ... B01J 23/74; B01J 23/94; B01J 29/40; B01J 29/94; B01J 38/02; C10G 1/02
See application file for complete search history.

(56) References Cited

U.S. PATENT DOCUMENTS

| | | |
|---|---|---|
| 4,490,241 A | 12/1984 | Chou |
| 4,820,493 A | 4/1989 | Haddad et al. |
| 4,961,907 A | 10/1990 | Herbst et al. |
| 5,071,539 A | 12/1991 | Hayward et al. |
| 5,176,815 A | 1/1993 | Lomas |
| 5,288,920 A | 2/1994 | Chan et al. |
| 5,800,697 A | 9/1998 | Lengemann |
| 8,003,835 B2 | 8/2011 | Yanik et al. |
| 8,057,641 B2 | 11/2011 | Bartek et al. |
| 8,063,258 B2 | 11/2011 | Bartek et al. |
| 8,137,632 B2 | 3/2012 | Bartek et al. |
| 8,226,818 B2 | 7/2012 | Sandacz |
| 8,288,600 B2 | 10/2012 | Bartek et al. |
| 8,323,477 B2 | 12/2012 | Couch et al. |
| 8,519,203 B2 | 8/2013 | Marinangeli et al. |
| 8,557,193 B2 | 10/2013 | Bartek et al. |
| 8,747,657 B2 | 6/2014 | Davydov et al. |
| 8,747,758 B2 | 6/2014 | Davydov et al. |
| 8,747,759 B2 | 6/2014 | Wolschlag et al. |
| 8,815,082 B2 | 8/2014 | Wolschlag et al. |
| 8,888,991 B2 | 11/2014 | Etter |
| 8,916,099 B2 | 12/2014 | Johnson et al. |
| 8,932,371 B2 | 1/2015 | Bartek et al. |
| 8,936,758 B2 | 1/2015 | Palmas et al. |
| 9,017,428 B2 | 4/2015 | Brady et al. |
| 9,044,727 B2 | 6/2015 | Kulprathipanja et al. |
| 2005/0234281 A1 | 10/2005 | Bjorklund |
| 2008/0152552 A1 | 6/2008 | Hedrick |
| 2009/0227823 A1 | 9/2009 | Huber et al. |
| 2010/0162625 A1 | 7/2010 | Mills |
| 2010/0209965 A1 | 8/2010 | O'Connor et al. |
| 2011/0139683 A1 | 6/2011 | Sandacz |
| 2011/0258912 A1 | 10/2011 | O'Connor et al. |
| 2011/0258913 A1* | 10/2011 | Stamires ................ C10L 1/026 44/307 |
| 2012/0117860 A1* | 5/2012 | Brady ...................... B01J 23/90 44/307 |
| 2013/0148463 A1 | 6/2013 | Davydov et al. |
| 2013/0148464 A1 | 6/2013 | Davydov et al. |
| 2013/0148465 A1 | 6/2013 | Wolschlag et al. |
| 2013/0150233 A1 | 6/2013 | Wolschlag et al. |
| 2013/0205651 A1 | 8/2013 | Wang et al. |
| 2013/0232855 A1 | 9/2013 | Loezos et al. |
| 2013/0250716 A1 | 9/2013 | Palmas et al. |
| 2013/0250717 A1 | 9/2013 | Johnson et al. |
| 2013/0252803 A1 | 9/2013 | Johnson et al. |
| 2013/0252805 A1 | 9/2013 | Palmas et al. |
| 2014/0121428 A1 | 5/2014 | Wang et al. |
| 2014/0163259 A1* | 6/2014 | Dakka ..................... B01J 38/48 568/376 |
| 2015/0203763 A1 | 7/2015 | Brady et al. |
| 2019/0085248 A1 | 3/2019 | Adkins et al. |

OTHER PUBLICATIONS

PCT International Search Report and Written Opinion in corresponding PCT/US16/053440 dated Jan. 9, 2017 (11 pages).

* cited by examiner

CATALYST ADDITION TO A CIRCULATING FLUIDIZED BED REACTOR

FIELD OF THE DISCLOSURE

The disclosure relates to a process of improving the yield and quality of bio-oil produced during the conversion of biomass in a single stage circulating fluidized bed reactor wherein solids are added to the reactor and separated from reactor effluent during various phases of the process.

BACKGROUND OF THE DISCLOSURE

Renewable energy sources, such as biofuels, provide a substitute for fossil fuels and a means of reducing dependence on petroleum oil. In light of its low cost and wide availability, solid biomass is often used as a feedstock to produce bio-oil which, in turn, is used to produce biofuel.

Many different conversion processes have been developed for converting solid biomass to bio-oil in a biomass conversion unit. Existing biomass conversion processes include, for example, thermolysis, such as slow pyrolysis and fast pyrolysis, and catalytic thermolysis. Thermolysis is characterized by the thermal decomposition of materials in an oxygen-poor or oxygen-free atmosphere (i.e., significantly less oxygen than required for complete combustion). The liquid product resulting from thermolysis of biomass includes organic materials. In some instances, the liquid product may be separated into an aqueous phase and an organic phase. The organic phase is commonly referred to as bio-oil. Bio-oil may be processed into transportation fuels as well as into hydrocarbon chemicals and/or specialty chemicals.

In addition to liquid reaction products, pyrolysis produces gaseous reaction products and solid reaction products. Gaseous reaction products include carbon dioxide, carbon monoxide, and relatively minor amounts of hydrogen, methane, and ethylene. Solid reaction products include carbonaceous deposits, such as coke and char. Such solids reduce the yield of bio-oil and are largely removed after the converted biomass exits the biomass conversion unit.

In order to maximize the liquid yield, while minimizing the solid and non-condensable gaseous reaction products, thermolysis is conducted at a relatively fast heating rate of the biomass feedstock. For example, the biomass may be rapidly heated between 150 and 600° C. and the reaction time kept short, i.e. on the order of milli-seconds to seconds. Such fast thermolysis results in high yields of primary, non-equilibrium liquids and gases (including valuable chemicals, chemical intermediates, petrochemicals and fuels).

There is a significant incentive to increase the yield of organic liquid products obtained by pyrolysis. To do so, it is necessary to enhance the yield of volatile condensable oily products (e.g., organic liquids) and reduce the levels of coke, char, gases (such as carbon monoxide and carbon dioxide).

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages.

SUMMARY OF THE DISCLOSURE

In an embodiment of the disclosure, solids are added into different locations of a circulating fluidized bed reactor. Such solids include catalysts used in the thermolysis of biomass. When the added solids are dissimilar, they may be separated from the effluent exiting the reactor. The ability to add solids into different locations and the ability to separate the solids in the reaction effluent enhances the yield and quality of bio-oil produced by catalytic pyrolysis by changing the nature of the catalytic reaction. The addition of solids into different locations is particularly desirable in a single stage system in which there is only one circulating fluidized bed reactor.

In another embodiment, a process of subjecting solid biomass to thermolysis in a riser reactor is provided wherein the riser reactor has a mixing zone and an upper zone above the mixing zone. A catalyst is introduced into the riser reactor through a catalyst point of entry. The catalyst at the catalyst point of entry has a temperature $T_1$. Solid biomass is then introduced through a biomass point of entry into the mixing zone upstream from the catalyst point of entry. The solid biomass and the catalyst are reacted in the mixing zone. A catalyst is introduced into an upper zone of the reactor. The temperature, $T_2$, at the point of entry of the catalyst into the upper zone is less than $T_1$. Effluent from the mixing zone is then subjected to fluidized catalytic thermolysis in the upper zone. The fluid effluent may then be separated into two fractions—a first fraction containing spent catalyst enriched in hard coke and a second fraction containing spent catalyst, soft coke and char. The second fraction may be fed into the mixing zone upstream from the biomass point of entry. The hard coke enriched spent catalyst is regenerated in a regeneration unit. A first portion of the regenerated spent catalyst may then be fed from the regeneration unit to a catalyst cooling chamber. A second portion of the regenerated catalyst may be fed from the regeneration unit to the reactor riser upstream from the mixing zone. The first portion of the regenerated catalyst may be cooled in the catalyst cooling chamber to temperature $T_2$. The cooled regenerated catalyst may then be introduced into the upper zone. Fresh catalyst may optionally be added to the riser reactor.

In another embodiment of the disclosure, solid biomass may be subjected to thermolysis in a riser reactor having a mixing zone and an upper zone above the mixing zone. A catalyst may be introduced into the riser reactor through a catalyst point of entry. Solid biomass may be introduced into a mixing zone through a biomass point of entry, wherein the biomass point of entry is downstream from the catalyst point of entry. The solid biomass and the catalyst may then be reacted in the mixing zone. Fresh catalyst may be fed into the riser reactor. The effluent recovered from the riser reactor comprises (i) a first fraction enriched in hard coke; and (ii) a second fraction containing spent catalyst, soft coke and char. The first fraction and the second fraction may then be separated. The spent catalyst in the second fraction and may be regenerated. The soft coke and char may be combusted. The first fraction may be fed into the riser reactor.

In another embodiment, a process of subjecting solid biomass to thermolysis in a riser reactor having a mixing zone and an upper zone above the mixing zone is provided. In this embodiment, a first solid particulate may be introduced into the riser reactor through a first solid particulate point of entry. Solid biomass may be introduced into a mixing zone through a biomass point of entry, wherein the biomass point of entry is downstream from the first solid particulate point of entry. The solid biomass and the first solid particulate may be reacted in the mixing zone. Solid effluent recovered from the riser reactor may comprise (i) a first fraction enriched in hard coke; and (ii) a second fraction containing spent first solid particulate, soft coke and char. The first fraction may be separated from the second fraction. The spent first solid particulate in the second fraction may be regenerated. The hard coke may be subjected to combustion. The second fraction may then be fed into the riser reactor.

In another embodiment of the disclosure, a process of subjecting solid biomass to thermolysis in a riser reactor is provided wherein the temperature in the reactor is controlled by a downstream cooling media. In this embodiment, a first catalyst is introduced into a riser reactor. The riser reactor has a mixing zone and an upper zone above the mixing zone. When introduced into the riser reactor, the first catalyst has a temperature $T_1$. A solid biomass is then introduced into the mixing zone of the riser reactor downstream from the entry of the first catalyst. The solid biomass and the first catalyst are mixed in the mixing zone. At least a portion of the solid biomass is reacted in the mixing zone. A second catalyst is then introduced into the upper zone of the riser reactor. The temperature of the second catalyst, $T_2$, is less than $T_1$. The entire effluent from the mixing zone is subjected to fluidized catalytic thermolysis in the upper zone of the riser reactor. At least a portion of the catalyst is recovered from the riser reactor and at least a portion of the recovered catalyst is regenerated. A first portion of the regenerated catalyst is then fed to a catalyst cooling chamber and a second portion of the regenerated catalyst is fed to the reactor riser upstream from the mixing zone. The first portion of the regenerated catalyst is then cooled in the catalyst cooling chamber to temperature $T_2$. The cooled regenerated catalyst is then introduced into the upper zone of the riser reactor.

In another embodiment of the disclosure, a process of subjecting solid biomass to thermolysis in a riser reactor is provided. The riser reactor has a mixing zone and an upper zone above the mixing zone. In this embodiment, a first catalyst having a temperature $T_1$ is introduced into the riser reactor. Solid biomass is also introduced into the mixing zone downstream from the point of entry of the first catalyst. The solid biomass and the first catalyst are mixed and the solid biomass is subjected to pyrolysis in the mixing zone. The resulting product, the mixing zone effluent, is then subjected to thermocatalysis in the upper zone. The temperature in the upper zone of the riser reactor is reduced by introducing into the upper zone a second catalyst. The temperature, $T_2$, of the second catalyst is less than $T_1$. At least a portion of the first catalyst and the second catalyst are recovered from the riser reactor and at least a portion of the recovered catalyst is regenerated. A first portion of the regenerated catalyst is fed to a catalyst cooling chamber and a second portion of the regenerated catalyst is fed to the reactor riser upstream from the mixing zone. The first portion of the regenerated catalyst is cooled in the catalyst cooling chamber to temperature $T_2$. The cooled regenerated catalyst is then introduced into the upper zone.

In another embodiment, a process of subjecting solid biomass to thermolysis in a riser reactor using a first solid particulate and a second solid particulate is provided. In this embodiment, the riser reactor has a mixing zone and an upper zone. A first solid particulate heated to a temperature $T_1$ is introduced into the riser reactor. Solid biomass is also introduced into the mixing zone downstream from the entry of the first solid particulate. The solid biomass and the first solid particulate are mixed in the mixing zone and the mixture is then subjected to pyrolysis where at least a portion of the solid biomass is pyrolyzed. A second solid particulate is then introduced into the upper zone of the riser reactor. The second solid particulate having been heated to a temperature $T_2$, wherein $T_2$ is less than $T_1$. The second solid particulate is a catalyst. The treated mixture is then subjected to fluidized catalytic thermolysis in the upper zone. At least a portion of the first solid particulate and the second solid particulate is removed from the riser reactor and the first solid particulate and the second solid particulate are separated. At least a portion of the separated first solid particulate and the separated second solid particulate are regenerated. At least a portion of the regenerated first solid particulate is fed into the riser reactor upstream from the mixing zone, the regenerated first solid particulate heated to the temperature $T_1$. At least a portion of the regenerated second solid particulate is cooled to the temperature $T_2$. At least a portion of the cooled regenerated second solid particulate is then fed into the upper zone as a cooling media and to cool the effluent from the mixing zone.

In another embodiment, a process of subjecting solid biomass to thermolysis in a riser reactor is provided wherein the temperature in the reactor is controlled by a cooling media which may, optionally, include a vaporizable liquid. The riser reactor has a mixing zone and an upper zone above the mixing zone. A first solid particulate heated to a temperature of $T_1$ is introduced into the riser reactor. Solid biomass is also introduced into the mixing zone downstream from the entry point of the first solid particulate. The solid biomass and the first solid particulate are mixed in the mixing zone and the solid biomass reacted. The resulting effluent from the mixing zone is then introduced into the upper zone; the temperature in the upper zone cooled by the addition of a cooling media into the upper zone. The cooling media comprises a second solid particulate comprising a solid catalyst and, optionally, the vaporizable liquid; the cooling media having a temperature, $T_2$, wherein $T_2$ is less than $T_1$. The mixing zone effluent is subjected to fluidized catalytic thermolysis in the upper zone.

In another embodiment of the disclosure, a process for converting solid biomass to hydrocarbons in a riser reactor using a vaporizable material as cooling media is provided. In this embodiment, a first solid particulate heated to a temperature of $T_1$ is introduced into the riser reactor. The riser reactor has an upper zone above a mixing zone. The solid biomass is introduced into the mixing zone downstream from the point of entry of the first solid particulate. The solid biomass and the first solid particulate are agitated in the mixing zone and the agitated mixture is reacted. The resulting pyrolyzed product is introduced to the upper zone of the riser reactor and the cooling media is introduced into the upper zone. The cooling media comprises the vaporizable material, the vaporizable material having a temperature, $T_2$, wherein $T_2$ is less than $T_1$. The solid biomass is subjected to fluidized catalytic thermolysis in the upper zone. A fluid stream is then separated from effluent from the riser reactor. An organic-enriched stream and an aqueous stream are separated from the fluid stream. The vaporizable material may be bio-naphtha separated from the organic-enriched stream and/or light hydrocarbons having a boiling point between from about 150° F. to about 180° F. originating from a topped bio-oil fraction from the organic-enriched stream.

In another embodiment of the disclosure, a process of subjecting solid biomass to thermolysis in a riser reactor is provided. The riser reactor has a mixing zone and an upper zone above the mixing zone. A first solid particulate, heated to a temperature of $T_1$, is introduced into the mixing zone of the riser reactor. The solid biomass is then introduced into the mixing zone downstream from the point of entry of the first solid particulate. The solid biomass and the first solid particulate are mixed in the mixing zone and the mixture treated such that at least a portion of the solid biomass is pyrolyzed. A vaporizable material having a temperature, $T_2$ (wherein $T_2$ is less than $T_1$), is introduced into the upper zone of the riser reactor as a cooling media and the treated mixture is subjected to fluidized catalytic thermolysis in the upper zone. The effluent from the catalytic thermolysis is removed from the riser reactor. The effluent is separated into a fluid phase and a solid phase. An organic-enriched phase is separated from the fluid phase and the organic-enriched phase is then separated into a bio-oil containing stream and a distillate stream. The vaporizable material is separated from the bio-oil containing stream or distillate stream. The separated vaporizable material is then introduced into the upper zone of the riser reactor as the cooling media.

Accordingly, the present disclosure includes features and advantages which are believed to enable it more efficiently produce bio-oil from solid biomass using a cooling media to control the temperature in the reactor. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
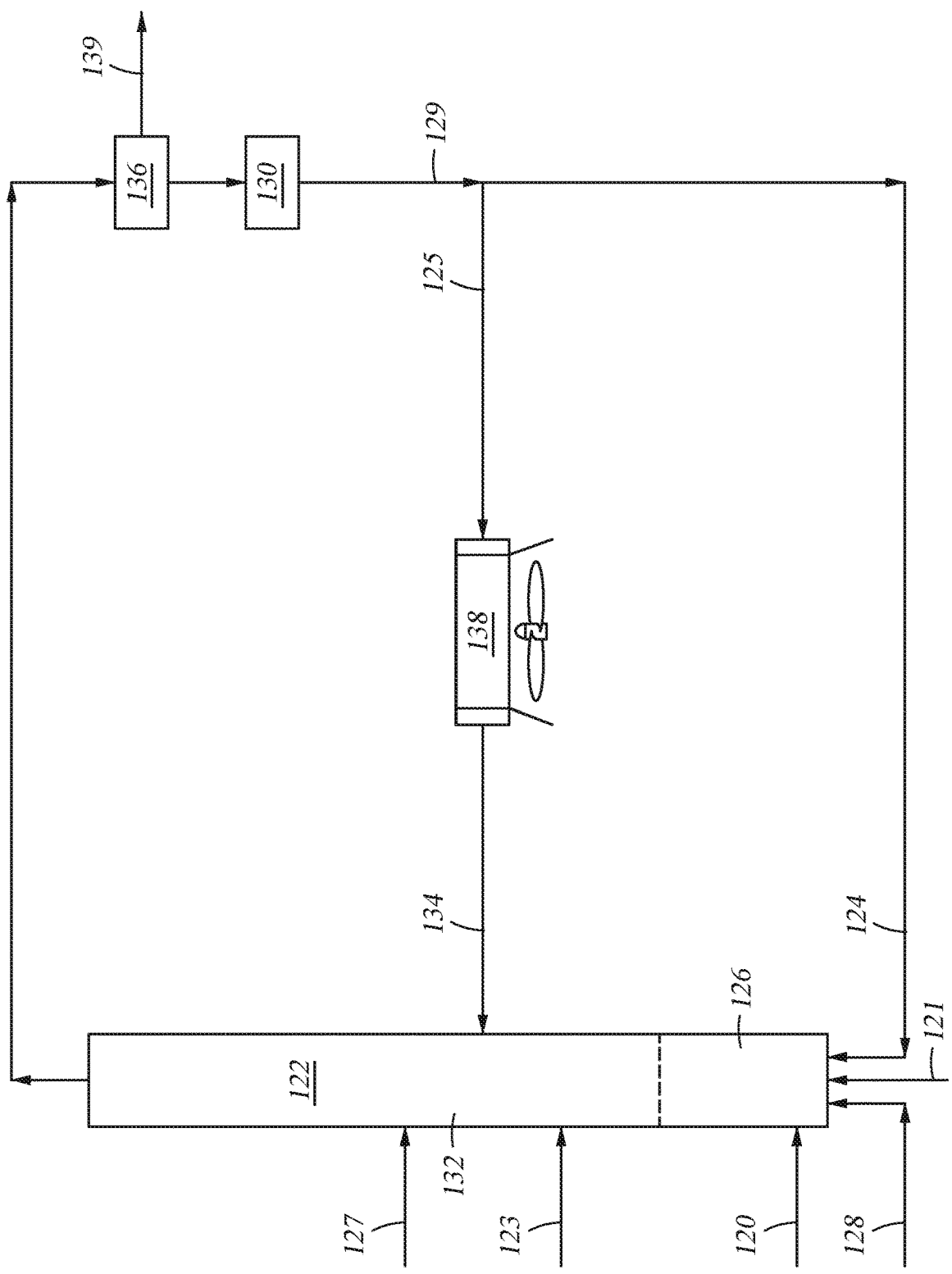
FIG. 1 is a flow diagram illustrating a process of converting a biomass into bio-oil by thermocatalysis using a single stage reactor as disclosed herein.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

In the process disclosed, a solid biomass feedstock is first agitated in the mixing zone of a biomass conversion unit in the presence of a solid particulate. Since the process may employ multiple solid particulates, the solid particulate introduced into the mixing zone shall be referred to as the "first solid particulate".

The biomass conversion unit is preferably a riser reactor. In addition to the mixing zone, the riser reactor has an upper zone into which effluent from the mixing zone ("the mixing zone effluent") advances. One or more zones ("uppermost zones") in the riser reactor may be located downstream from the upper zone. The upper zone and uppermost zones are thermal zones and are not necessarily physically separate zones or separated zones.

The first solid particulate may be any suitable heat exchange material. Heat exchange materials may be inorganic, such as sand. Exemplary heat exchange materials may further include a biomass conversion catalyst (BCC).

Suitable biomass conversion catalysts include those known in the art, such as (i) a solid acid, such as a zeolite, super acid, clay, etc., (ii) a solid base, such as metal oxides, metal hydroxides, metal carbonates, basic clays, etc., (iii) a metal or a compound containing a metal functionality, such as Fe, Cu, Ni (like NiW or NiMo), transition metal sulfides such as sulfided NiMo, sulfided CoMo, etc., reduced metals, such as reduced Ni; noble metal catalysts, such as Ru, Pt, and Pd, transition metal carbides, etc., (iv) an amphoteric oxide, such as alumina, silica, titania, etc. and (v) a metal loaded onto a support such as alumina, silica, zirconia, carbon, etc. Catalysts with an acid functionality such as a silica-alumina, sulfated oxides, and support phosphoric acids are also exemplary BCCs.

The biomass may be in the form of solid particles of finely divided particles. The biomass may be introduced into the mixing zone of the reactor in a slurry. The biomass is rarely pre-heated prior to being introduced into the mixing zone.

In an embodiment, the biomass may include fibrous materials comprising cellulose. Examples of suitable cellulose-containing materials include algae, paper waste, and/or cotton linters. In one embodiment, the biomass comprises a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

The first solid particulate is added to the riser reactor upstream from the point of entry of the biomass into the mixing zone. The first solid particulate acts as a heat source and enables the cracking of the biomass into smaller molecules. Bio-oil is produced from the cracking of the biomass. Agitation of the biomass and the first solid particulate in the mixing zone is very brief, typically no more than 20 seconds and, in many instances, less than 20 milliseconds.

In the mixing zone, the biomass and the first solid particulate are combined with an upwardly flowing gas from a lift gas source. The solid biomass and first solid particulates are entrained by the lift gas and rise upwardly into the upper zone of the reactor. The lift gas introduced into the mixing zone may be any of a variety of substantially oxygen-free gases including inert gases (such as nitrogen, steam or carbon dioxide), reducing gases (such as hydrogen or carbon monoxide, etc.

In the mixing zone, the biomass and the first solid particulate may be subjected to shearing action sufficient to mix the biomass and particulates to facilitate the conversion of the biomass into bio-oil. This may include turbulent gas flow within the reactor. For instance, in some cases, the design of the catalyst bed within the reactor may provide eddies and vortices for turbulent gas flow. Mechanical action may further provide the requisite shear for conversion of the biomass into bio-oil. Such mechanical action may be provided by kneading, milling, crushing, extruding, chopping, mixing or a combination thereof.

Typically, the temperature in the mixing zone in the riser reactor during agitation of the biomass and the first solid particulate is between from about 900° F. to about 1350° F. The temperature in the mixing zone may be controlled by adjusting the ratio of the first solid particulate to the solid biomass introduced into the mixing zone.

The temperature, $T_1$, of the first solid particulate introduced into the mixing zone is typically from about 1100° F. to about 1400° F. The temperature in the mixing zone at the time of introduction of the solid biomass into the mixing zone is between from about 950° F. to about 1400° F.

The mixing zone effluent (which includes the bio-oil converted from the biomass) ascends into the upper zone of the riser reactor. The mixing zone effluent contains solids, bio-oil, gases as well as minerals. While coke and char may be left as residue in the mixing zone, the mixing zone effluent advancing into the upper zone of the riser reactor contains most of the coke and char produced during conversion of the biomass. In addition, while minerals may remain in the inventory of the first solid particulate in the mixing zone, they may also be contained in the mixing zone effluent.

In an embodiment, fresh catalyst may be added into the riser reactor.

The fresh catalyst may include any of the catalysts referenced above as the first solid particulate. In an embodiment, the fresh catalyst may be a "Type II catalyst". Preferably, the Type II catalyst is added to the reactor downstream from the mixing zone. The biomass feedstream may contain metals which interfere with catalyst in the mixing zone. Such interfering metals include those of Group I and II, including calcium, potassium and sodium. The addition of the Type II catalyst downstream from the mixing zone minimizes deactivation of catalyst activity caused by such interfering metals.

In a preferred embodiment, the Type II catalyst exhibits different activity than the first solid particulate. For example, the Type II catalyst may be one which exhibits greater sensitivity to deactivation at higher temperatures with unreacted biomass feed in the reactor. In an embodiment, the first solid particulate and Type II catalyst may differ from each other by a physical property, such as particle size, density, chemical composition, etc.

The Type II catalyst typically is more active in coupling of smaller olefins and oxygenates (such as $C_3$-$C_5$ olefins and oxygenates) which are formed in the high temperature pyrolysis zone. The use of the Type II catalyst thus produces larger molecules, including aromatics, which boil in the fuel range. Deoxygenation and aromatization thus enhances the yield of bio-oil from the pyrolysis reactor.

Fresh catalyst may be added in multiple zones of the reactor. The fresh catalyst added into multiple zones is preferably a Type II catalyst. In a preferred embodiment, where fresh catalyst is added to multiple locations, different catalysts are used in order to provide an increase in activity with unreacted biomass feed.

The Type II catalyst may be any of the catalysts referenced above in regards to the first solid particulate. For instance, the Type II catalyst may be a zeolite, such as ZSM-5, beta zeolite, Y zeolite, etc. Further, the Type II catalyst may be hydrotalicite as well as a bifunctional cracking catalyst containing impregnated Ni, Mo, Co, solid oxide, water gas shift catalyst, etc). Further, the Type II catalyst may be a multifunctional catalyst. Exemplary multifunctional catalysts include those comprising zeolite ZSM-5; zeolite USY; a metallic component such as Cu, Ni, Cr, W, Mo, a metal carbide, a metal nitride, a metal sulfide and mixtures thereof a basic material such as alkaline-exchanged zeolite, alkaline earth-exchanged zeolite, basic zeolite, alkaline earth metal oxide, cerium oxide, zirconium oxide, titanium dioxide, mixed oxides of alkaline earth metal oxides and combinations thereof and mixed oxides selected from the group of magnesia-alumina, magnesia-silica, titania-alumina, titania-silica, ceria-alumina, ceria-silica, zirconia-alumina, zirconia-silica and mixtures thereof and wherein the exchanged zeolite has from about 40 to about 75% of exchanged cationic sites; and a binder such as kaolin based binders, alumina based or silica based or a combination thereof. Such multifunctional catalysts include those set forth in U.S. patent application Ser. No. 14/168,787, filed on Jan. 30, 2014, herein incorporated by reference.

The Type II catalyst may be added into the reactor upstream from the mixing zone but downstream from the upper zone as defined above. Further, the Type II catalyst may be added into the reactor upstream from the upper zone. Where an uppermost zone is used in the reactor, as defined herein, the Type II catalyst may be added into the reactor downstream from the upper zone but upstream from the uppermost zone. Alternatively, the Type II catalyst may be added into the reactor upstream from the uppermost zones.

The mixing zone effluent is subjected to thermolysis in the upper zone of the riser reactor. A cooling media may be introduced into the upper zone of the riser reactor. The cooling media contacts the mixing fluid effluent as it ascends into the upper zone of the riser. The cooling media most desirably does not condense in the reactor riser during thermolysis.

The temperature of the cooling media, $T_2$, is lower than $T_1$. While $T_2$ may be as low as ambient, $T_2$ more typically from about 500° F. to about 1100° F. In an embodiment, the difference between $T_2$ of the cooling media entering the upper zone of the riser reactor and $T_1$ of the first solid particulate is between from about 50° F. to about 500° F.

The temperature of the mixing zone effluent is reduced by the cooling media. Thus, thermolysis in the upper zone of the riser reactor proceeds at a lower temperature than the mixing zone effluent. Typically, a high rate of heat transfer to the biomass occurs during reaction of the solid biomass and the first solid particulate in the mixing zone of the riser reactor.

Without the use of the cooling media disclosed herein excessive overcracking of the biomass may occur in the riser reactor as the outlet temperature from the reactor is near the inlet temperature of the solid particulate in the mixing zone. The addition of the cooling media in the upper zone reduces the production of carbon monoxide and light gases during thermolysis. This, in turn, reduces the efficiency of deoxygenation downstream from the riser reactor. Thus, the cooling media decreases the temperature in the riser reactor in a controlled manner that suppresses the thermal reactions relative to the catalytic reactions.

The cooling media may be a solid particulate or a vaporizable material. Where a solid particulate is introduced into the upper zone of the riser reactor, it shall be referred to herein as the "second solid particulate".

Catalytic thermolysis may be conducted in the upper zone by use of a catalyst as the cooling media. Exemplary catalysts for use as cooling media include any of the biomass conversion catalysts set forth in the paragraphs above.

Where the first solid particulate and the second solid particulate are both catalysts, the catalyst introduced into the mixing zone and the upper zone, respectively, may be the same catalyst or different catalysts.

Where the first solid particulate and the second solid particulate are different materials, they preferably are separable from each other in order that they may be regenerated as separate streams in different regenerators. Alternatively, the first and second solid particulates may be first regenerated in a single regenerator and the regenerated products separated downstream from the regenerator, yet upstream from the cooling media.

The first solid particulate and second solid particulate may differ from each other by a physical property, such as particle size, density, etc.

Typically, the weight ratio of first solid particulate to second solid particulate introduced into the mixing zone and the upper zone of the riser reactor, respectively, is between from about 85:15 to about 15:85.

The riser reactor may have more than one zone downstream from the mixing zone. For instance, the riser reactor may have an uppermost zone downstream from the upper zone. A heat exchange material, defined herein, may be fed into the uppermost zone to enhance thermolysis efficiency. The heat exchange material ("the third solid particulate") may also serve as a cooling media. The heat exchange material introduced into the uppermost zone may differ from the second solid particulate and/or first solid particulate.

Where a solid particulate is used in the uppermost zone, the weight ratio of the first solid particulate to the third solid particulate is preferably between from about 85:15 to about 15:85.

The temperature of the third solid particulate, $T_3$, introduced into the uppermost zone of the reactor is different from $T_1$ and $T_2$ and typically is less than $T_2$.

The riser effluent may include solids and fluid (e.g. gas and vapors) as well as spent and/or used solid particulate(s). Typically, the amount of coke and char produced in the riser during thermolysis is between from about 9 to about 25% by weight based on the weight of the solid biomass. In an embodiment, the majority of the coke and char exits the riser reactor as part of the riser effluent.

The solids and gases in the riser effluent are separated in a gas solid separator. Suitable separators may include any conventional device capable of separating solids from gas and vapors such as, for example, a cyclone separator, gas filter, coalescer, gravity phase separator, etc. Typically, from about 95 to essentially 100% percent of the solids are removed from the mixture in the separator. Optionally and preferably, remaining solids in the mixture may further be removed, such as by polishing filtration.

The separated gas stream containing volatile components may be processed downstream. In addition to the removal of heavy materials and solids, water may be removed during the separation.

The separated solids may then be sent into a regeneration unit.

Where the first solid particulates and second solid particulates (and optional third solid particulates) do not differ from each other then the solid particulates may be regenerated in a single regeneration unit. A portion of the regenerated solid particulates may then be fed into the mixing zone upstream from the point of entry of the biomass into the mixing zone. A portion of the regenerated solid particulates may be fed into the cooling chamber and cooled to a temperature, $T_2$, and then introduced into the upper zone as cooling media. Where the riser reactor has an uppermost zone, a portion of the regenerated solid particulates may be fed into the uppermost zone.

Where the first solid particulates, second solid particulates and/or third solid particulates are distinct and separable from each other, streams containing the first solid particulates, second solid particulates and/or third solid particulates may be introduced into a solids separator capable of separating the streams.

Once separated, each of the streams may be alternatively introduced into separate regeneration units where char and coke are combusted and activity is restored to each of the particulates. The separated first solid particulates may then be introduced into the reactor riser upstream from the mixing zone, the separated second solid particulates, after being cooled to a temperature of $T_2$, may be introduced into the upper zone of the riser reactor as cooling media and, where applicable, the separated third solid particulates may be introduced into the uppermost zone of the riser reactor.

As an alternative, in that instance where the first solid particulates, second solid particulates and/or third solid particulates are distinct and separable from each other, the stream containing the first solid particulates, second solid particulates and/or third solid particulates may be introduced into a regenerator where char and coke are combusted and activity is restored to the particulates. The particulates may then be separated in a solids separator upstream from the cooling media. The separated first solid particulates may then be introduced into the riser reactor upstream from the mixing zone, the second solid particulates, after being cooled to a temperature of $T_2$, may be introduced into the upper zone of the reactor as cooling media and, where applicable, the separated third solid particulates may be introduced into the uppermost zone of the riser reactor.

Instead of the cooling media being a solid particulate, the cooling media may comprise a vaporizable material. The vaporizable material, cooled to a temperature of $T_2$, may originate downstream. In an embodiment, for instance, the vaporizable material may constitute a distillate from fractionation. In another embodiment, the vaporizable material may constitute a distillate from a hydrotreatment process. Vaporizable materials may include, for example, ethanol, methanol, butanol, a glycol or a combination thereof.

In an embodiment, char and soft coke in the riser effluent may be removed from spent catalyst (along with hard coke). In the regeneration unit, char and coke are combusted and activity is restored to at least some of the first solid particulates [and/or, in some embodiments, the second solid particulates and/or (where applicable) the third solid particulates]. Recycling a portion of the catalyst, soft coke and char for conversion into transportation fuels increases fuel yield.

In an embodiment, a fraction enriched with soft coke and char may be separated from volatiles and spent catalyst and then introduced into the reactor, such as the mixing zone. Fresh or make-up solid particulates of the first solid particulate may be added into the enriched fraction and the mixed stream then added into the riser reactor.

Typically, 8 or 9 weight percent of coke and char (based on the weight of the biomass feed) is desired to be produced in the riser to provide the requisite amount of heat energy for thermolysis. At this level, the temperature conditions in the riser reactor are balanced. Typically, however, higher percentages of coke and char are produced during thermolysis. For instance, an additional 6 to 10 weight percent of coke and char may be generated than necessary. Generated hard coke only has combustion value. Feeding of coke and char directly into the reactor enhances the efficiency of the process by minimizing the amount of coke that would ordinarily be combusted in the regeneration unit.

The processes referred to herein may be continuous.

Various alternative embodiments of the process are set forth in the Figures. It should be understood that all of the apparatus and processes mentioned below may have any suitable number and type of components, configuration and operation, as is and may become further known. Further, all embodiments of the present disclosure are neither limited to, nor require, each component, process and the particular details mentioned below.

Referring to FIG. 1, in accordance with an embodiment of the present disclosure, a method of producing renewable fuels from biomass material is provided wherein the first solid particulates and the second solid particulates are the same and are catalysts. As depicted, a solid biomass feedstream 120 is fed from one or more external sources into a biomass conversion unit, shown as riser reactor 122. The biomass is heated and mixed with first catalyst 124 in mixing zone 126. The temperature in the mixing zone during mixing is between from about 900° F. to about 1350° F. As shown, first catalyst 124 and lift gas 128 are added upstream from the point of entry of biomass 120 into riser reactor 122. First catalyst 124 acts as a heat source enabling the cracking of the biomass in mixing zone 126. The residence time of mixing solid biomass 120 and first catalyst 124 in mixing zone 126 is very brief, typically no more than 20 seconds, and in some cases less than 20 milli-seconds.

FIG. 1 shows first catalyst 124 being fed into riser reactor 122 as regenerated catalyst from regenerator 130. The temperature, $T_1$, of first catalyst 124 introduced into mixing zone 126 is typically from about 1100° F. to about 1400° F.

The mixing zone effluent containing bio-oil ascends into upper zone 132 of riser reactor 122. The mixing zone effluent is subjected to catalytic thermolysis in upper zone 132. The second catalyst 134 (the cooling media) of temperature $T_2$ (where $T_2$ is lower than $T_1$) is introduced into upper zone 132. The temperature of the mixing zone effluent is reduced by second catalyst 134 such that catalytic thermolysis occurs in upper zone 132 at a cooler temperature than the reaction in mixing zone 126.

After exiting riser reactor 122, the riser effluent is introduced into solids separator 136. In solids separator 136, solids and fluids 139 in the riser effluent are separated. The solids which include char, coke and spent and/or used catalyst, are introduced into regenerator 130. In regenerator 130, char and coke are combusted and catalytic activity is restored to at least some of the catalyst.

After regeneration, at least a portion of the hot regenerated catalyst 129 may be fed back into mixing zone 126 of riser reactor 122 as stream 124. A portion of hot regenerated catalyst 129 from regenerator 130 may be fed into cooling chamber 138 (shown as stream 125) and cooled to $T_2$. The resulting cooled catalyst 134 then enters into the upper zone 132 of riser reactor 122.

Also shown in FIG. 1 is the optional addition of fresh catalyst into the reactor. Fresh catalyst may be introduced into the riser reactor at multiple points of entry. As illustrated, fresh catalyst stream 121 may be added into mixing zone 126. Fresh catalyst stream 127 is also shown as being added to an area in the reactor downstream from the mixing zone. This stream may be in place of stream 121 or in addition to fresh catalyst stream 121. Where the riser reactor has a distinct upper zone, as illustrated in FIG. 1, fresh catalyst stream 123 may be added into the riser reactor 122 downstream from the mixing zone 126. Where multiple fresh catalyst streams are introduced into the reactor, the catalysts in each of the streams is preferably dissimilar to each other. In a preferred embodiment, each of the catalysts introduced into the reactor riser are Type II catalysts.

While FIG. 1 illustrates the addition of fresh catalyst to a reactor having a defined upper zone with cooling media, it is not necessary that this be the case. Fresh catalyst may be added to the single stage riser reactor in those instances where a cooling media is not used.

Figure 2:
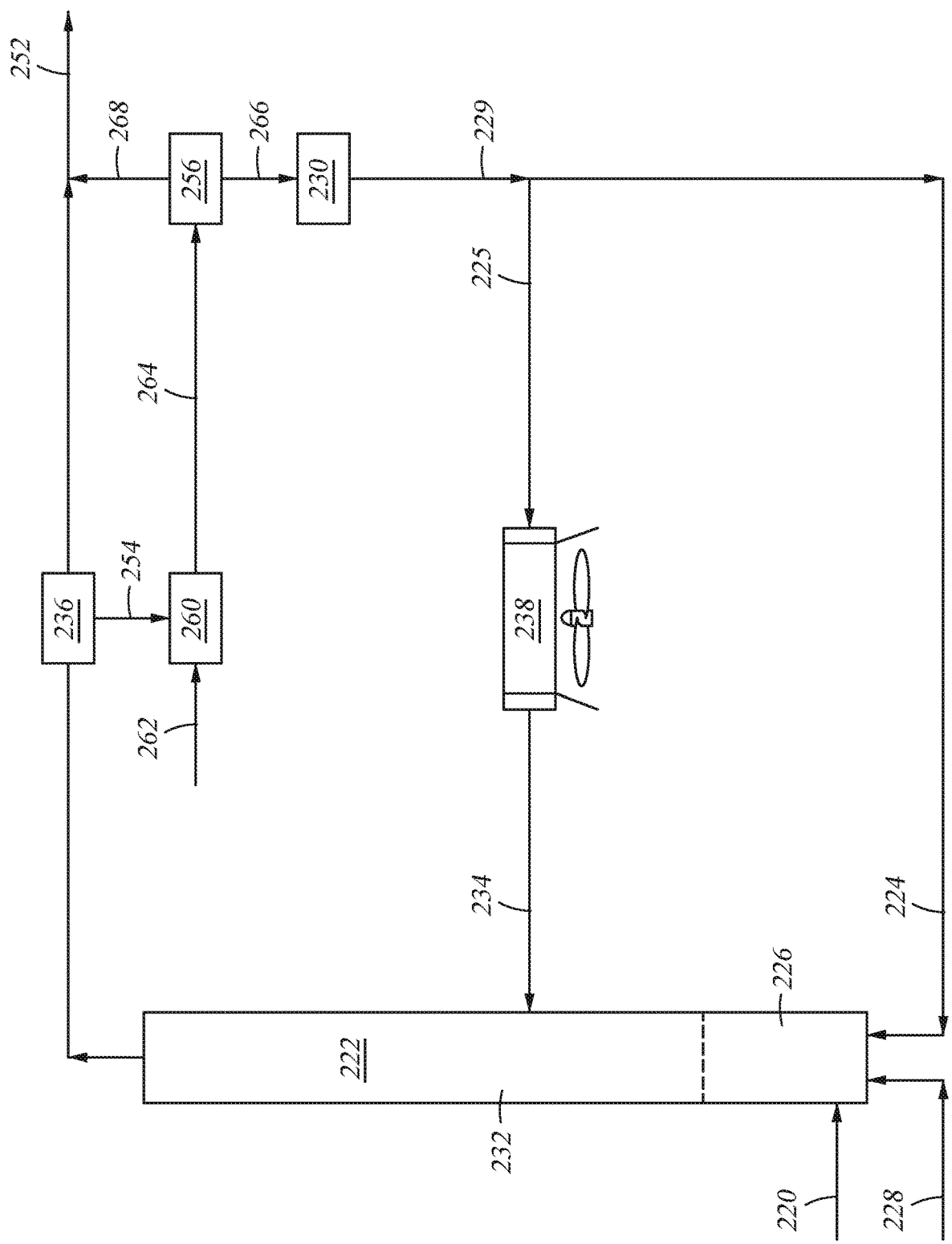
FIG. 2 is a flow diagram illustrating an alternative process of converting a biomass into bio-oil using a cooling media comprising regenerated catalyst.

FIG. 2 illustrates a modification of the process depicted in FIG. 1 wherein solid catalyst 224 and lift gas 228 are introduced into mixing zone 226 upstream from entry of biomass feed 220. In FIG. 2, the riser effluent stream from riser reactor 222 is introduced into solid/gas separator 236 to produce gas stream 252 and fluid stream 254. Separated gas stream 252 containing volatile components may be further processed downstream.

Separated fluid stream 254 is then treated in stripper 260 with stripping media 262. Suitable stripping media include steam, natural gas, nitrogen as well as other inert gases. In a preferred embodiment, the stripping media is steam.

Stripped stream 264 containing catalyst, volatiles and, predominately, hard coke is then fed into second separator 256. The volatiles in stream 264 are removed as stream 268 in second separator 256 and may be processed downstream with stream 252. Solid stream 266 from second separator 256 contains hard coke, characterized by low hydrogen content, and spent catalyst. The residual coke is removed from the spent catalyst in regenerator 230, principally by combustion.

Regenerated catalyst 229 may be fed back into mixing zone 226 as stream 224 or into catalyst cooling chamber 238 as stream 225 and cooled to $T_2$. Cooled regenerated catalyst 234 may then be fed into upper zone 232.

Figure 3:
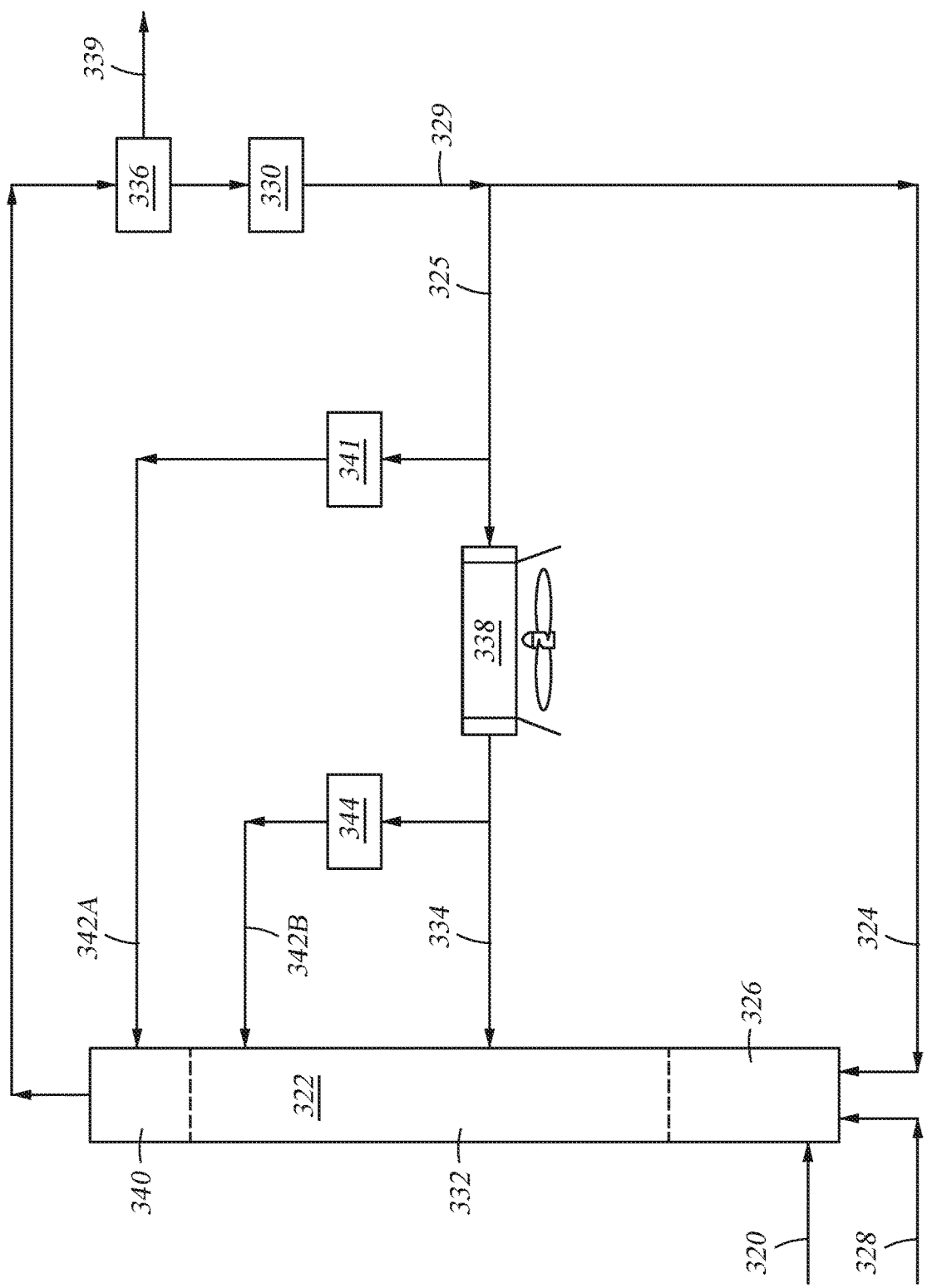
FIG. 3 is a flow diagram illustrating a process of converting a biomass into bio-oil by use of a cooling media and dissimilar solid particulates.

The riser reactor used in the conversion of biomass may consist of more than two zones. Depicted in FIG. 3 is riser reactor 322 having mixing zone 326, upper zone 332 and uppermost zone 340. The temperature in uppermost zone 340 is less than the temperature in upper zone 332. As in FIG. 1, solid biomass 320 is fed from one or more external sources into mixing zone 326 of riser reactor 322 and is heated and mixed with first catalyst 324 and lift gas 328. First catalyst 324 and lift gas 328 are added to mixing zone 326 upstream from the point of entry of the biomass into the mixing zone. First catalyst 324 is fed into mixing zone 326 as regenerated catalyst stream 324 from regenerator 330.

The mixing zone effluent is subjected to catalytic thermolysis in upper zone 332. A portion of hot regenerated catalyst 329 from regenerator 330 is fed as stream 325 into cooling chamber 338. The second catalyst 334 (the cooling media) of temperature, $T_2$, cooled in cooling chamber 338, is introduced into upper zone 332, wherein $T_2$ is lower than $T_1$.

As illustrated in FIG. 3, a third catalyst 342 may be introduced into uppermost zone 340 and catalytic thermolysis is then advanced from upper zone 332 to uppermost zone 340. In this depiction, the first catalyst 324, second catalyst 334 and third catalyst 342 are the same. The riser effluent may be treated as discussed in the processes depicted in FIG. 1 and FIG. 2 and the catalyst separated from gaseous fluid 339 in separator 336 may then be regenerated in regenerator 330. The temperature of the third catalyst, $T_3$, introduced into uppermost zone 340 is lower than $T_2$ which, in turn, is lower than $T_1$.

FIG. 3 illustrates two exemplary embodiments for the cooling of third catalyst 342 prior to introducing the third catalyst into uppermost zone 340. In one embodiment, a portion of regenerated catalyst of stream 325 may be diverted into catalyst cooling chamber 341 and the cooled catalyst 342A then introduced into uppermost zone 340. In another embodiment, a portion of regenerated catalyst stream 325 may be diverted into catalyst cooling chamber 338. In catalyst cooling chamber 338, the regenerated catalyst is cooled to the temperature $T_2$ for introducing second catalyst 334 into upper zone 332. A portion of the second catalyst from catalyst cooling chamber 338 may be further diverted to a second catalyst cooling chamber 344 to render the third catalyst 342B having a temperature of $T_3$. Either or both of these alternative embodiments may be used to render the third catalyst of temperature $T_3$.

Figure 4:
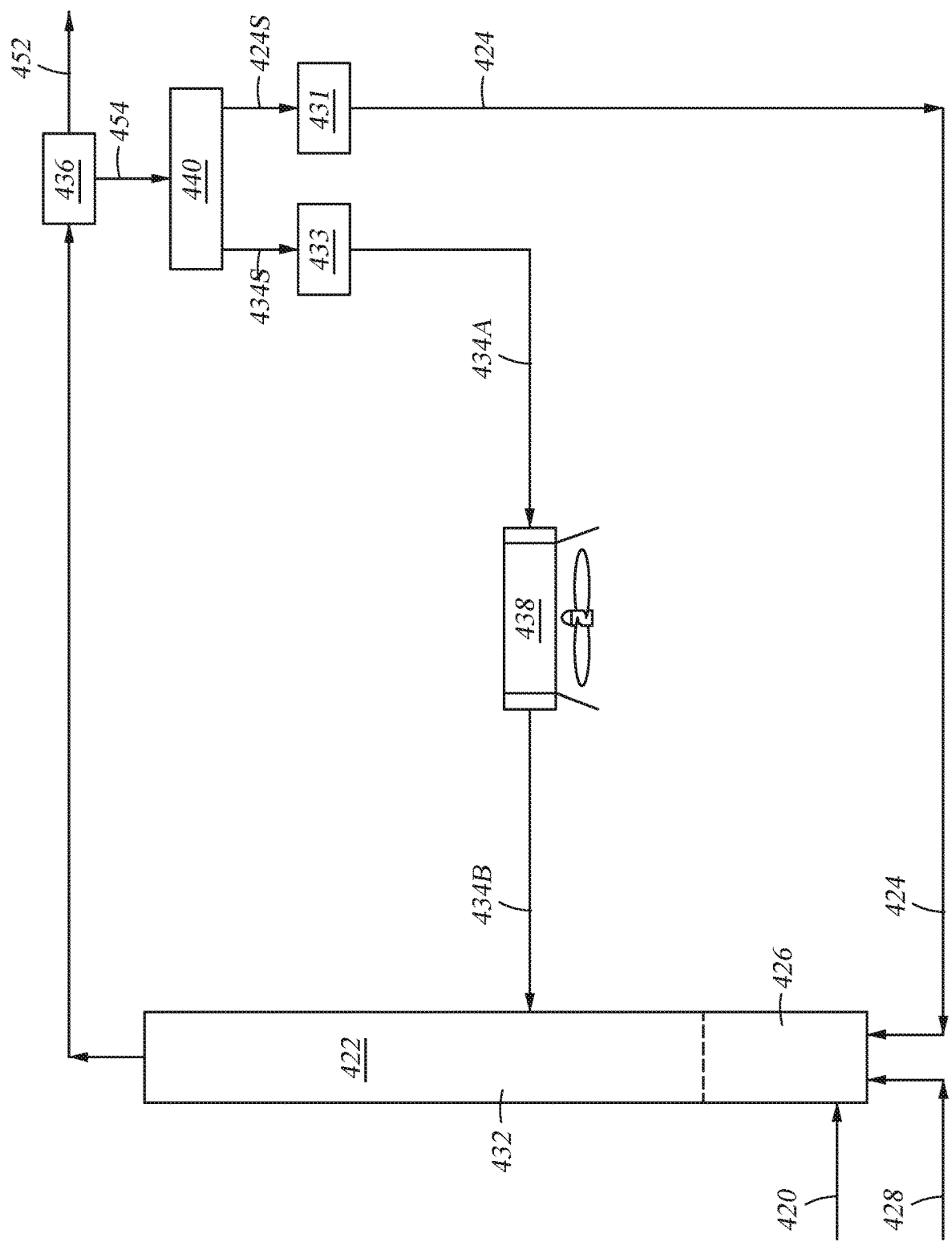
FIG. 4 is a flow diagram illustrating a process of converting a biomass into bio-oil by use of a cooling media and regenerated dissimilar solid particulates.

FIG. 4 illustrates another embodiment of the disclosure, where two different catalysts are used in the conversion of biomass and wherein both catalysts are regenerated during the conversion process. The two catalysts may differ in particle size, density or by other properties which permit the two catalysts to be separated. It will be understood that FIG. 4 may be modified to include more than two regenerators where the process involves one or more zones downstream from the upper zone.

Referring now to FIG. 4, solid biomass 420 and lift gas 428 are fed into mixing zone 426 of riser reactor 422.

First solid particulates 424 (which may be a biomass conversion catalyst) having a temperature of $T_1$, are provided to riser reactor 422 and are heated and mixed with the biomass feedstream in mixing zone 426. As shown, first solid particulates 424 are added upstream from the point of entry of biomass 420 into riser reactor 422. First solid particulates 424 may be fed into riser reactor 422 as regenerated particulates from regenerator 431.

The mixing zone effluent ascends into upper zone 432 of riser reactor 422. The mixing zone effluent is subjected to catalytic thermolysis in upper zone 432. Second solid particulates 434 (which may also be a biomass conversion catalyst) having temperature, $T_2$, are introduced into upper zone 432, wherein $T_2$ is lower than $T_1$. A portion of second solid particulates 434 may be regenerated solid particulates from regenerator 433.

First solid particulates 424 and second solid particulates 434B introduced into mixing zone 426 and upper zone 432, respectively, are different solid particulates and may differ by a physical property, such as particle size, density, etc.

Referring still to the embodiment of FIG. 4, the riser effluent ascends and exits riser reactor 422 through a top port. The riser effluent may include solids and fluid (e.g. gas and vapors) as well as spent first solid particulates and spent second solid particulates. After exiting riser reactor 422, the riser effluent is introduced into solid/gas separator 436 to render gas stream 452 and fluid stream 454. Separated gas stream 452 containing volatile components may be further processed downstream.

Spent first solid particulates 424S (spent particulates of solid particulates 424) and spent second solid particulates 434S in fluid stream 454 are separated from each other in solids separator 440. Solids separator 440 may be a conventional separator known in the art, such as a gravitational separator or magnetic separator, provided it is capable of separating solid particulates of different density, particle size, etc.

First solid particulates 424 are regenerated from spent first solid particulates catalyst 424S in first regenerator 431 where char and coke are combusted and activity is restored to them. Second solid particulates 434B are regenerated from spent second solid particulates 434S in second regenerator 433, where char and coke are combusted and activity is restored.

After regeneration, hot regenerated first solid particulates 424 may be fed back into mixing zone 426 of riser reactor 422. A portion of the second solid particulates 434A regenerated in regenerator 433 may further be fed into catalyst cooling chamber 438 and cooled to $T_2$. The resulting cooled regenerated catalyst 434B is then fed into upper zone 432 of riser reactor 422.

Figure 6:
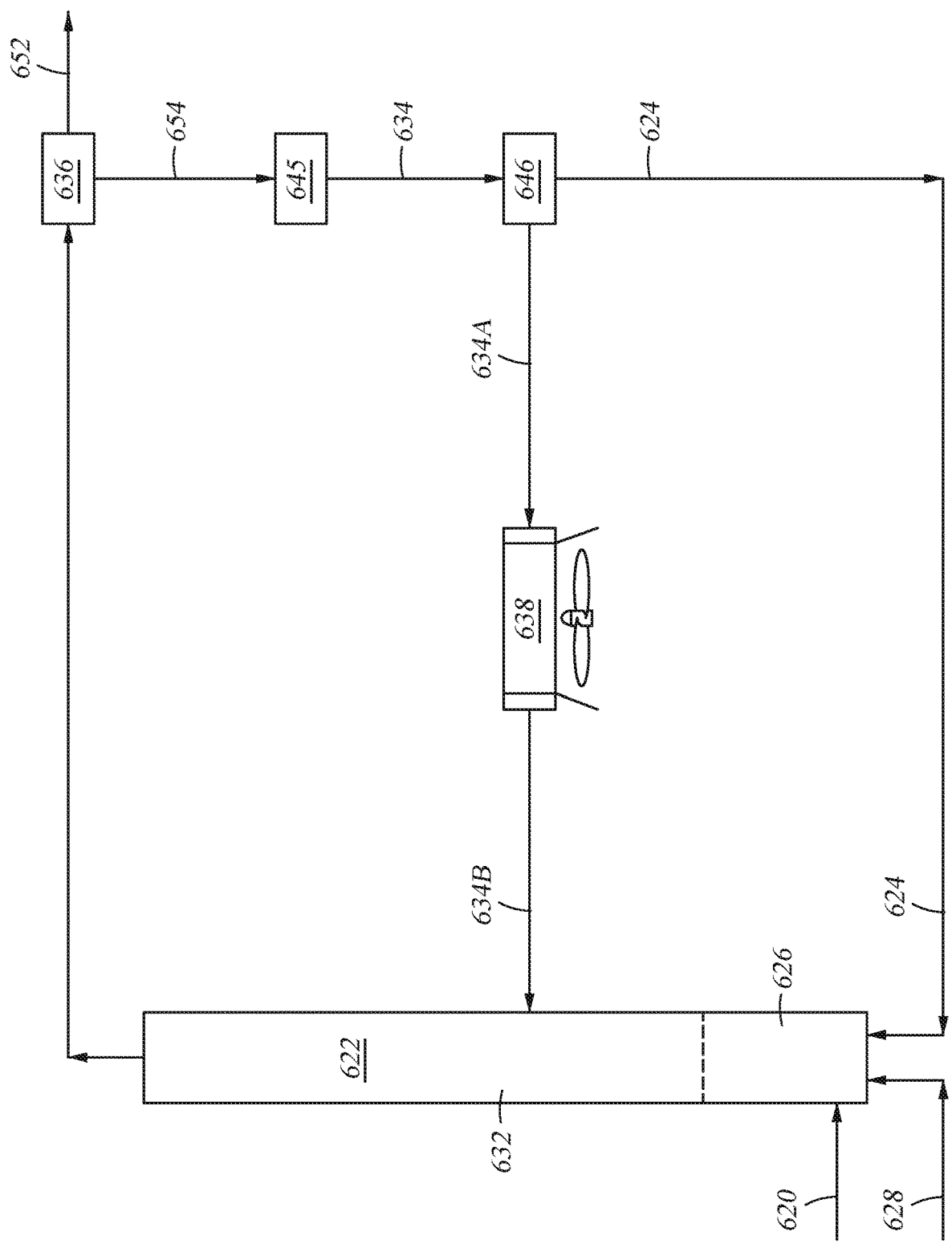
FIG. 6 is a flow diagram illustrating an alternative process of converting a biomass into bio-oil by use of a cooling media and regenerated dissimilar solid particulates.

FIG. 6 illustrates another embodiment where two different catalysts are used in the conversion of biomass and wherein both catalysts are regenerated during the conversion process. The two catalysts may differ in particle size, density or by other properties which permit the two catalysts to be separated. Referring to FIG. 6, solid biomass 620 is fed into mixing zone 626 of riser reactor 622.

First solid particulates 624 (which may be a biomass conversion catalyst) having a temperature of $T_1$, are provided to riser reactor 622 and are heated and mixed with the biomass feedstream in mixing zone 626. As shown, first solid particulates 624 as well as lift gas 628 are added upstream from the point of entry of biomass 620 into riser reactor 622. First solid particulates 624 may be fed into riser reactor 622 as regenerated particulates from solid separator 646.

The mixing zone effluent ascends into upper zone 632 of riser reactor 622. The mixing zone effluent is subjected to catalytic thermolysis in upper zone 632. Second solid particulates 634B (which may also be a biomass conversion catalyst) having temperature, $T_2$, are introduced into upper zone 632, wherein $T_2$ is lower than $T_1$. A portion of second solid particulates 634B may be regenerated solid particulates separated in separator 646.

First solid particulates 624 and second solid particulates 634B introduced into mixing zone 626 and upper zone 632, respectively, are different solid particulates and may differ by a physical property, such as particle size, density, etc.

Referring still to the embodiment of FIG. 6, the riser effluent ascends and exits riser reactor 622 through a top port. The riser effluent may include solids and fluid (e.g. gas and vapors) as well as spent first solid particulates and spent second solid particulates. After exiting riser reactor 622, the riser effluent is introduced into solid/gas separator 636 to render gas stream 652 and fluid stream 654. Separated gas stream 652 containing volatile components may be further processed downstream.

Fluid stream 654 is then introduced into regenerator 645 where char and coke are combusted and where spent first solid particulates and spent second solid particulates are regenerated and their activity restored. The regenerated solid particulates 634 are then fed from regenerator 645 into separator 646 where regenerated first solid particulates 624 and regenerated second solid particulates 634A are separated. Solids separator 646 may be a conventional separator known in the art, such as a gravitational separator, provided it is capable of separating solid particulates of different density, particle size, etc.

Hot regenerated first solid particulates 624 may be fed back into mixing zone 626 of riser reactor 622. At least a portion of the regenerated second solid particulates 634A separated in separator 646 may further be fed into catalyst cooling chamber 638 and cooled to $T_2$. The resulting cooled regenerated catalyst 634B is then fed into upper zone 632 of riser reactor 622.

Figure 5:
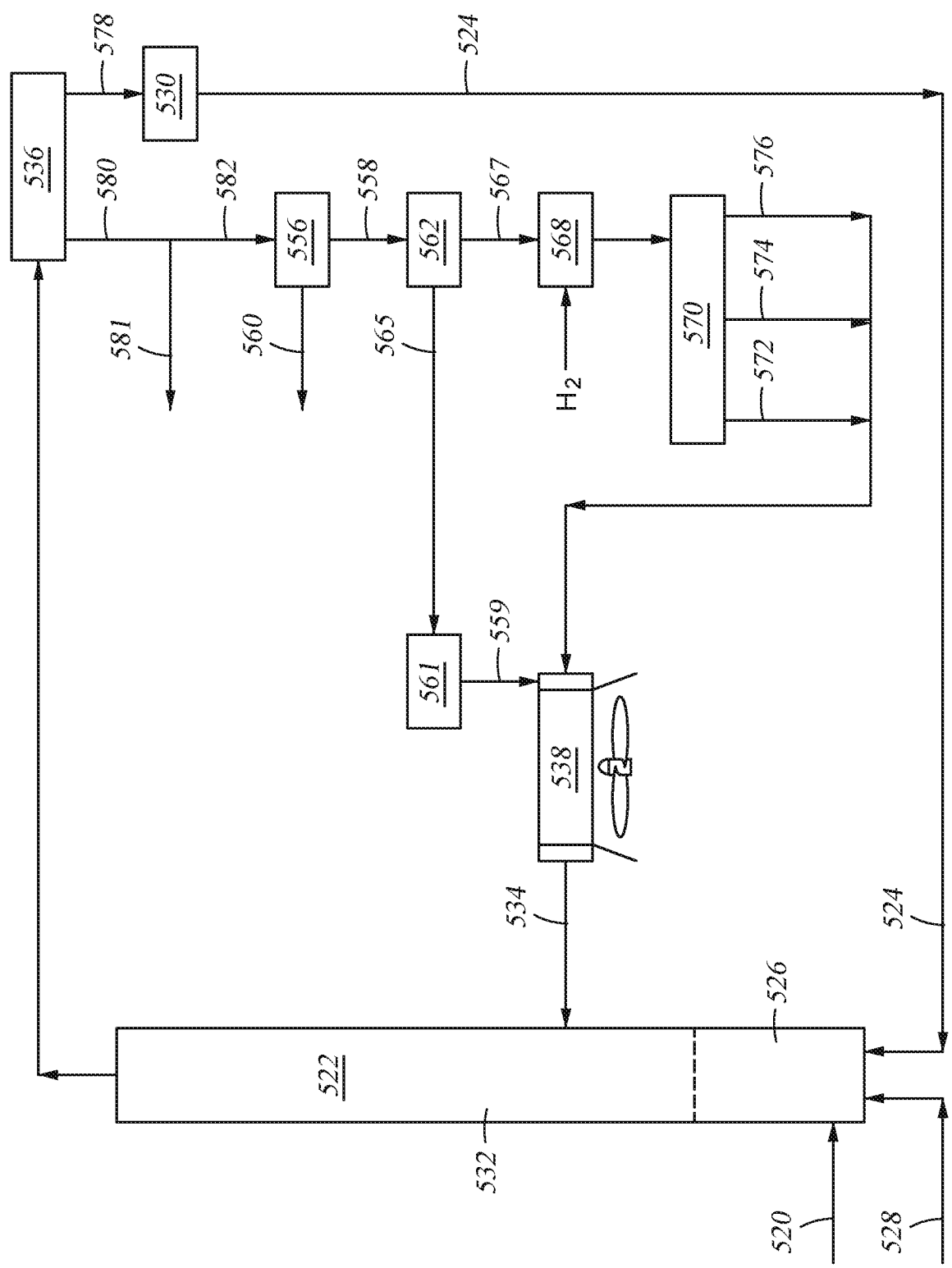
FIG. 5 is a flow diagram illustrating a process of converting a biomass into bio-oil by use of a cooling media comprising vaporizable material.

FIG. 5 illustrates another embodiment of the disclosure where the cooling media entering into the upper zone of the riser reactor is a vaporizable material. As illustrated, solid biomass feedstock 520 is fed into mixing zone 526 of reactor riser 522. First solid particulates (which may be a catalyst) 524 and lift gas 528 are fed into mixing zone 526. Mixing zone 526 is downstream from the point of entry of first solid particulates 524. First solid particulates 524 may be fed into riser reactor 522 as regenerated particulates from regenerator 530. The biomass and first solid particulates are agitated in mixing zone 526.

The mixing zone effluent then enters into upper zone 532 where it is cooled by cooling media 534 having a temperature of $T_2$. The cooling media is a vaporizable material treated in cooling chamber 538. Fluid stream 578 containing combustible solids and gaseous stream 580 in the riser effluent are separated in solid gas separation unit 536.

Fluid stream 578 containing spent first solid particulates may then be fed into regeneration unit 530 where the stream undergoes combustion and first solid particulates are regenerated. Regenerated first solid particulates 524 may then be fed back into mixing zone 526 of riser reactor 522 through a port upstream from the entry port of the biomass.

Gaseous stream 580 may then be cooled and quenched to provide gaseous stream 581 and liquid stream 582. Liquid stream 582 may then be fed into separator 556 to render organic-enriched stream 558 and aqueous stream 560. The organic-enriched stream 558 and aqueous stream 560 in separator 556. The organic-enriched phase 558 may further be separated in fractionator 562 into a full range bio-naphtha ("Bio-FRN") 565 containing light oxygenates of $C_5$ or less, a heavier bio-oil, or topped bio-oil fraction 567 containing $C_6$ or greater oxygenates and water (not shown). Bio-FRN 565 may be further separated in separator 561 and the bio-naphtha distillate 559 passed into cooling chamber 538.

Topped bio-oil stream 567 may be fed into hydrotreater 568. In the hydrotreater, the bio-oil containing stream is subjected to deoxygenation and desulfurization by the introduction of hydrogen.

Following deoxygenation in the hydrotreater, the deoxygenated stream may then be introduced into fractionator 570 to render renewable bio-oil (RBO). In fractionator 570, at least a portion of the material may be separated into light fraction stream 572, intermediate fraction stream 574 and heavy fraction stream 576 for use in renewable bio-fuels. The light fraction stream may have a boiling range below petroleum-derived gasoline and the intermediate fraction may have a boiling range comparable to petroleum-derived gasoline. The heavy fraction stream may have a boiling range comparable to diesel fuel. For instance, in an embodiment, the light fraction stream may have a boiling point between from about 150° F. to about 180° F., the intermediate fraction may have a boiling point between from about 180° F. to about 420° F. and the heavy fraction may have a boiling point above 420° F. Light fraction stream 572, intermediate fraction stream 574 and/or heavy fraction stream 576 may then be introduced as vaporizable material into catalyst cooling chamber 538. Preferably, all or a portion of heavy fraction stream 576 is fed into cooling chamber 538.

Figure 7:
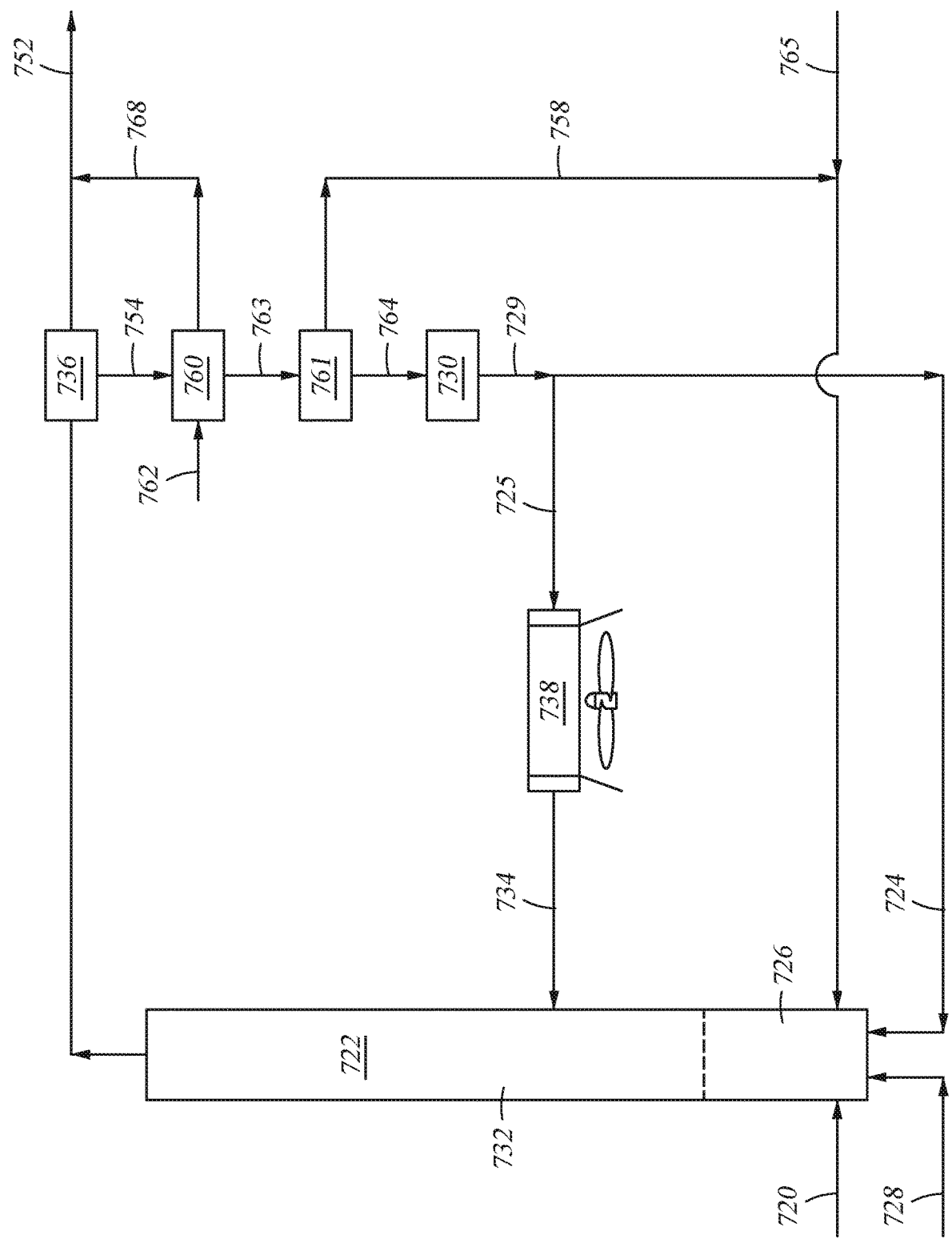
FIG. 7 is a flow diagram illustrating an alternative process wherein soft coke and Char is removed from a reaction effluent stream and recycled back into the reactor riser.

FIG. 7 illustrates a modification of the process depicted in FIG. 1 and FIG. 2 wherein solid catalyst 724 and lift gas 728 are introduced into mixing zone 726 upstream from entry of biomass feed 720. The main products from the riser are a vapor and a stripped solid which is comprised of catalyst and char. The catalyst particles contain hard coke, soft coke and char (which also includes catalyst fines and soft coke). The riser effluent stream from riser reactor 722 is introduced into solid/gas separator 736 to produce gas stream 752 and fluid stream 754. Separated gas stream 752 containing volatile components may be further processed downstream. Separated fluid stream 754 is then treated in stripper 760 with stripper medium 762. Suitable stripping media include steam, natural gas, nitrogen as well as other inert gases. In a preferred embodiment, the stripping media is steam. The stripped volatiles stream 768 is combined with 752 which may be further processed downstream.

A fraction 764 enriched in hard coke may be separated from the volatiles in solids separator 761. (Hard coke is herein defined to be coke deposited on the catalyst. It includes hydrocarbon molecules that are not stripped with the volatile hydrocarbons. Soft coke is more volatile than hard coke and has a higher hydrogen and oxygen content than hard coke. Soft coke is usually carbonized at lower temperatures than hard coke, typically between from about 600° C. to about 700° C. and provides produced with reduced volume content of the order of 9% and hence better combustion characteristics.) The soft coke and char enriched fraction 758 may then be introduced into reactor riser 722. In an embodiment, fresh catalyst 765 may be introduced into enriched fraction 758. The combined stream may then be introduced into reactor riser 722. Cooled regenerated catalyst 734 may then be fed into upper zone 732.

Solid stream 764 from second separator 761 contains coke, characterized by low hydrogen content, and spent catalyst. The coke may be removed from the spent catalyst in regenerator 730, principally by combustion. Regenerated catalyst 729 may be fed back into mixing zone 726 as stream 724. A portion of the regenerated stream 725 may be fed into cooling chamber 738 and cooled to $T_2$. The cooled liquid stream 734 may then be introduced into upper zone 732 of the reactor riser.

In an embodiment, fresh catalyst 763 may be a Type II catalyst may be introduced into enriched fraction 758. The combined stream may then be introduced into reactor riser 720.

Since the process is continuous, Type II catalyst introduced into the riser reactor may be separated from first solid particulate in solids separator 761. Thus, by formulating the catalyst to be distinct from the first solid particulate, the Type II catalyst may be separated from the first solid particulate which will pass into regeneration unit 756.

The riser reactor used in the conversion of biomass may consist of more than two zones. Depicted in FIG. 3 is riser reactor 322 having mixing zone 326, upper zone 332 and uppermost zone 340. The temperature in uppermost zone 340 is less than the temperature in upper zone 332. As in FIG. 1, solid biomass 320 is fed from one or more external sources into mixing zone 326 of riser reactor 322 and is heated and mixed with first catalyst 324 and lift gas 328. First catalyst 324 and lift gas 328 are added to mixing zone 326 upstream from the point of entry of the biomass into the mixing zone. First catalyst 324 is fed into mixing zone 326 as regenerated catalyst stream 324 from regenerator 330.

The mixing zone effluent is subjected to catalytic thermolysis in upper zone 332. A portion of hot regenerated catalyst 329 from regenerator 330 is fed as stream 325 into cooling chamber 338. The second catalyst 334 (the cooling media) of temperature, $T_2$, cooled in cooling chamber 338, is introduced into upper zone 332, wherein $T_2$ is lower than $T_1$.

As illustrated in FIG. 3, a third catalyst 342 may be introduced into uppermost zone 340 and catalytic thermolysis is then advanced from upper zone 332 to uppermost zone 340. In this depiction, the first catalyst 324, second catalyst 334 and third catalyst 342 are the same. The riser effluent may be treated as discussed in the processes depicted in FIG. 1 and FIG. 2 and the catalyst separated from gaseous fluid 339 in separator 336 may then be regenerated in regenerator 330. The temperature of the third catalyst, $T_3$, introduced into uppermost zone 340 is lower than $T_2$ which, in turn, is lower than $T_1$.

While not shown in FIGS. 3, 4, 5, 6 and 7, it is understood that effluent from the riser may be separated into a gas stream and a fluid stream and the separated gas stream may then be treated in a stripper with a stripping media (as illustrated in FIG. 2).

Preferred embodiments of the present disclosure thus offer advantages over the prior art and are well adapted to carry out one or more of the objects of this disclosure. However, the present disclosure does not require each of the components and acts described above and are in no way limited to the above-described embodiments or process of operation. Any one or more of the above components, features and processes may be employed in any suitable configuration without inclusion of other such components, features and processes. Moreover, the present disclosure includes additional features, capabilities, functions, processes, uses and applications that have not been specifically addressed herein but are, or will become, apparent from the description herein, the appended drawings and claims.

EXAMPLES

The Examples herein are provided to illustrate different aspects of the disclosure. In the baseline case, hot catalyst and nitrogen were introduced to the bottom of a reactor riser, at a temperature of $T_1$. The biomass was then added and mixed with the hot catalyst, yielding a temperature of $T_h$. In the examples herein, cooler catalyst of temperature $T_2$ was then added further downstream, yielding a lower temperature of $T_c$.

For these examples the biomass contained 35 pounds of water for every 500 pounds of biomass on a dry basis. Nitrogen was added at 250 lb/hr while biomass was introduced at 500 lb/hr on a dry basis. The biomass and the nitrogen were introduced at 70° F. The temperature of the regenerated catalyst was 1325° F. In these examples the portion of circulating catalyst introduced above the feed point was cooled to 800° F. The following physical properties are assumed for these examples:

Biomass and pyrolysis products have a heat capacity of 0.406 BTU/lb ° F.

The heat of reaction for pyrolysis of the biomass is −85.5 BTU/lb

The nitrogen has a heat capacity of 0.263 BTU/lb ° F.

The catalyst has a heat capacity of 0.265 BTU/lb ° F.

The moisture in the biomass has a heat capacity of 0.454 BTU/lb ° F.

The heat of vaporization for the initial moisture in biomass is 970 BTU/lb

Base.

Hot catalyst was circulated at 4000 lb/hr and all of the catalyst was introduced into the riser reactor, below the biomass feed point.

Example 1

In Example 1, the total catalyst circulation rate remained at 4000 lb/hr, but 1000 lb/hr of the catalyst flow was passed through a heat exchanger that reduced the temperature of the catalyst from 1325° F. to 800° F. This cooler catalyst was introduced to the riser at a point downstream from the biomass feed.

Example 2

In Example 2, the total catalyst circulation rate was increased to 6000 lb/hr. Of this amount, 4000 lb/hr was introduced to the bottom of the riser (upstream from the biomass feed). The remaining 2000 lb/hr was cooled from 1325° F. to 800° F. and introduced at a point downstream from the biomass feed.

Example 3

In Example 3, the total catalyst circulation rate was 4000 lb/hr. Half of the catalyst was introduced to the bottom of the riser at 1325° F. while the other half was cooled to 800° F. and then introduced to the riser at a point downstream from the biomass feed.

The temperatures in the three zones ($T_1$, $T_h$ and $T_c$ for each case are shown in Table I below.

TABLE I

| Ex. | $T_1$ (° F.) | $T_h$ (° F.) | $T_c$ (° F.) |
|---|---|---|---|
| Base | 1252 | 1066 | 1066 |
| Example 1 | 1229 | 1002 | 963 |
| Example 2 | 1252 | 1066 | 991 |
| Example 3 | 1187 | 897 | 859 |

The process that may be described above or claimed herein and any other process which may fall within the scope of the appended claims can be performed in any desired suitable order and are not necessarily limited to any sequence described herein or as may be listed in the appended claims. Further, the process of the present disclosure does not necessarily require use of the particular embodiments shown and described herein, but are equally applicable with any other suitable structure, form and configuration of components.

The biomass to be pyrolyzed is generally ground to a small particle size in order to optimize pyrolysis. The biomass may be ground in a grinder or a mill until the desired particle size is achieved.

While exemplary embodiments of the disclosure have been shown and described, many variations, modifications and/or changes of the system, apparatus and process of the present disclosure, such as in the components, details of construction and operation, arrangement of parts and/or process of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A process of subjecting solid biomass to thermolysis in a riser reactor having a mixing zone and an upper zone above the mixing zone and into which effluent from the mixing zone advances, the process comprising:
   (a) introducing a catalyst into the mixing zone of the riser reactor through a catalyst point of entry, wherein the catalyst at the catalyst point of entry has a temperature $T_1$,
   (b) introducing solid biomass through a biomass point of entry into the mixing zone downstream from the catalyst point of entry;
   (c) mixing the solid biomass and the catalyst in the mixing zone and reacting at least a portion of the solid biomass;
   (d) introducing catalyst into an upper zone of the reactor, wherein the temperature, $T_2$, of the catalyst at the point of entry of the catalyst into the upper zone is less than $T_1$;
   (e) subjecting effluent from the mixing zone to fluidized catalytic thermolysis in the upper zone;
   (f) separating riser effluent from the riser reactor into gases and solids and further separating the solids into (i) a first fraction enriched in hard coke and (ii) a second fraction containing spent catalyst, soft coke and char;
   (g) feeding the first fraction into the mixing zone upstream from the biomass point of entry;
   (h) regenerating the spent catalyst in the second fraction in a regeneration unit and subjecting the soft coke and char to combustion;
   (i) feeding a first portion of the regenerated spent catalyst from the regeneration unit to a catalyst cooling chamber and a second portion of the regenerated catalyst from the regeneration unit to the mixing zone of the riser reactor;
   (j) cooling the first portion of the regenerated catalyst in the catalyst cooling chamber to temperature $T_2$; and
   (k) introducing the cooled regenerated catalyst into the upper zone.

2. The process of claim 1, further comprising adding fresh catalyst to the riser reactor.

3. The process of claim 2, wherein the fresh catalyst is fed into the riser reactor downstream from the mixing zone but upstream from the point of entry of the catalyst into the upper zone at the temperature, $T_2$.

4. The process of claim 2, wherein the fresh catalyst is fed into the riser reactor upstream from the point of entry of the catalyst into the upper zone at the temperature, $T_2$.

5. The process of claim 2, wherein the fresh catalyst is added to the upper zone of the reactor above the point of entry of the catalyst into the upper zone.

6. The process of claim 5, wherein the added fresh catalyst is dissimilar from the catalyst of step (d).

7. The process of claim 6, wherein each stream of fresh catalyst introduced into the reactor riser is a Type II catalyst.

8. The process of claim 2, wherein the fresh catalyst is added into both the mixing zone and the upper zone of the riser reactor.

9. The process of claim 8, wherein the Type II catalyst is selected from the group consisting of ZSM-5, beta zeolite, Y zeolite, hydrotalicite, bifunctional catalysts containing impregnated metals or solid oxides, Ni, Mo, Co, solid oxide, water gas shift catalysts, multifunctional catalysts and mixtures thereof.

10. The process of claim 2, wherein the fresh catalyst is added into either the mixing zone or the upper zone.

11. The process of claim 1, wherein the separated spent catalyst is added into the riser reactor upstream from the biomass point of entry.

12. The process of claim 11, wherein $T_1$ is from about 1100° F. to about 1400° F. and $T_2$ is from about 500° F. to about 1100° F. provided $T_2$ is less than $T_1$.

13. The process of claim 1, wherein the separated spent fresh catalyst is a Type II catalyst.

14. The process of claim 13, wherein the solid oxide is Ni, Mo, Co or a mixture thereof.

15. The process of claim 1, wherein the temperature in the mixing zone during mixing is between from about 900° F. to about 1350° F.

16. The process of claim 1, wherein $T_1$ is from about 1100° F. to about 1400° F. and $T_2$ is from about 500° F. to about 1100° F. provided $T_2$ is less than $T_1$.

17. A process of subjecting solid biomass to thermolysis in a riser reactor having a mixing zone and an upper zone above the mixing zone and into which effluent from the mixing zone advances, the process comprising:
   (a) introducing a first solid particulate into the mixing zone of the riser reactor through a first solid particulate point of entry,
   (b) introducing solid biomass into the mixing zone through a biomass point of entry, wherein the biomass point of entry is downstream from the first solid particulate point of entry;
   (c) mixing the solid biomass and the first solid particulate in the mixing zone and reacting at least a portion of the solid biomass;
   (d) recovering effluent from the upper zone of the riser reactor wherein the effluent comprises (i) a first fraction enriched in hard coke; and (ii) a second fraction containing spent first solid particulate, soft coke and char;
   (e) separating the first fraction from the second fraction;
   (f) regenerating the spent first solid particulate in the second fraction and subjecting the soft coke and char to combustion; and
   (g) feeding the regenerated spent first solid particulate into the mixing zone of the riser reactor.

18. The process of claim 17, wherein the first solid particulate is a catalyst.

19. The process of claim 18, further comprising the addition of fresh catalyst to the riser reactor.

\* \* \* \* \*